United States Patent
Daita

(10) Patent No.: US 7,409,232 B2
(45) Date of Patent: Aug. 5, 2008

(54) PORTABLE COMMUNICATION TERMINAL SET

(75) Inventor: Rie Daita, Saitama (JP)

(73) Assignee: NEC Corporation, Tokyo (JP)

( * ) Notice: Subject to any disclaimer, the term of this patent is extended or adjusted under 35 U.S.C. 154(b) by 138 days.

(21) Appl. No.: 10/786,306

(22) Filed: Feb. 26, 2004

(65) Prior Publication Data

US 2004/0171394 A1    Sep. 2, 2004

(30) Foreign Application Priority Data

Feb. 27, 2003    (JP) .............................. 2003-050463

(51) Int. Cl.
*H04B 1/38*    (2006.01)

(52) U.S. Cl. ................. 455/566; 455/412.1; 455/412.2; 455/413; 455/414.1; 455/550.1; 345/87; 345/156; 345/169; 345/173

(58) Field of Classification Search ................. 455/415, 455/414.1, 566, 567, 412.1, 412.2, 413, 417; 379/142.01, 142.04, 142.06, 373.01, 373.03, 379/374.01, 374.02
See application file for complete search history.

(56) References Cited

U.S. PATENT DOCUMENTS

| | | | | |
|---|---|---|---|---|
| 4,949,287 A * | 8/1990 | Yamaguchi et al. | .......... | 715/246 |
| 5,907,604 A * | 5/1999 | Hsu | ...................... | 379/142.06 |
| 6,512,819 B1 * | 1/2003 | Sato et al. | ................. | 379/93.23 |
| 6,580,928 B1 * | 6/2003 | Aoki | ........................... | 455/566 |
| 6,675,008 B1 * | 1/2004 | Paik et al. | ................... | 455/415 |
| 6,751,485 B2 * | 6/2004 | Ranta | ........................... | 455/567 |
| 6,766,018 B1 * | 7/2004 | Morita | .................. | 379/355.09 |
| 6,791,773 B2 * | 9/2004 | Nagaoka | ...................... | 359/833 |
| 6,876,871 B2 * | 4/2005 | Hirayama et al. | ........... | 455/566 |
| 7,174,163 B2 * | 2/2007 | Aksu et al. | ............... | 455/414.1 |
| 2002/0094806 A1 * | 7/2002 | Kamimura | .................. | 455/415 |
| 2003/0022659 A1 * | 1/2003 | Mun et al. | .................. | 455/415 |
| 2003/0224830 A1 * | 12/2003 | Zhang et al. | ................. | 455/566 |
| 2004/0017376 A1 * | 1/2004 | Tagliabue et al. | ........... | 345/581 |

FOREIGN PATENT DOCUMENTS

| | | |
|---|---|---|
| EP | 1 033 878 A2 | 9/2000 |
| EP | 1 033 878 A3 | 12/2000 |
| JP | 10-327233 | 12/1998 |
| JP | 10327233 A  * | 12/1998 |
| JP | 2000-253373 | 9/2000 |
| JP | 2001-186569 | 7/2001 |
| JP | 2002-016673 | 1/2002 |
| JP | 2002-111896 | 4/2002 |

OTHER PUBLICATIONS

Noboru Fujiwara Patent Abstracts of Japan, JP 10327233 A, Dec. 8, 1998, English Language Translation.*

* cited by examiner

*Primary Examiner*—Charles N. Appiah
*Assistant Examiner*—Olumide T Ajibade Akonai
(74) *Attorney, Agent, or Firm*—McGinn IP Law Group, PLLC

(57) ABSTRACT

Stored are data including image data representing a plurality of images, opposite side party data representing a plurality of opposite side parties of communication, combination data representing the correspondence relation between the image data and opposite side party data and communication history data representing the history of communication. An image of image data corresponding to a pertinent opposite side party of communication is displayed in response to a call arrival and/or a user's operation based on combination data stored in the memory part.

18 Claims, 4 Drawing Sheets

Fig.2
| | TELEPHONE NO. | MAIL ADDRESS | NAME | FACE IMAGE DATA |
|---|---|---|---|---|
| 1 | 09043211234 | abc@xxx··· | ○○○○ | ----- |
| 2 | | | | |
| 3 | | | | |
| 4 | | | | |
| · | | | | |
Fig.3
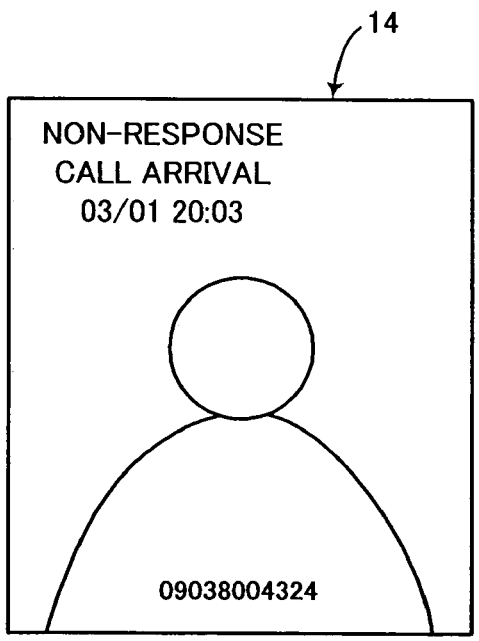
Fig.4
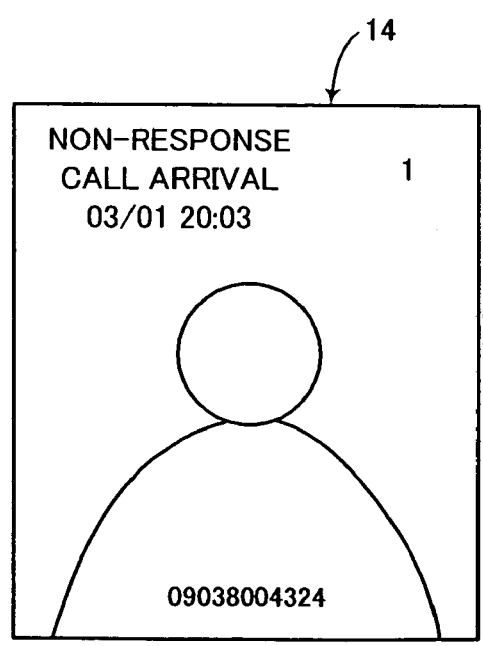

PORTABLE COMMUNICATION TERMINAL SET

BACKGROUND OF THE INVENTION

This application claims benefit of Japanese Patent Application No. 2003-050463 filed on Feb. 27, 2003, the contents of which are incorporated by the reference.

The present invention relates to a portable communication terminal set which, like a portable telephone set or a PDA, is constructed such that it can display various data on the surface of an image display part.

The usual portable telephone set or the like is adapted to permit telephone calls by reading out a telephone numbers of the opposite side of communication registered in a telephone diary stored in a memory part based on the corresponding names or titles of the opposite side. There is also a gradually spreading model having a camera part, and in which images of the faces or the like of the opposite side of communication, picked up by the camera part, is stored in the memory part. In this model the face image is displayed on the display of the telephone set along with the opposite side data as name or telephone number.

In the portable telephone set communication system, it is presently indispensable convenient function to accumulate non-response call arrival having not been responded so as to permit a non-response call arrival history based on these data be displayed on the display as desired by the user operation.

It is further a great featured function of the portable telephone system to store and confirm such data as short mails and messages stored until an instant of time lapse of several hours or several days after the data transmission with the provision of same significance as in the usual simultaneous bilateral voice communication such as telephone communication. Up to date, however, no specific proposal has been made in connection with the portable communication terminal set such as portable telephone set, in which the image of the face or the like of the opposite side of communication can be utilized even in the case of utilizing the non-response call arrival history or stored messages.

SUMMARY OF THE INVENTION

An object of the present invention is therefore to provide a portable communication terminal set capable of utilization of the image of the face or the like of the opposite side even in the case of utilizing non-response call arrival history or stored messages.

According to an aspect of the present invention, there is provided a portable communication terminal set comprising a radio part for executing radio communication with external sets, a memory part for storing data including image data representing a plurality of images, opposite side party data representing a plurality of opposite side parties of communication, combination data representing the correspondence relation between the image data and opposite side party data and communication history data representing the history of communication executed by the radio part, a display part for executing necessary displays, an operation part for accepting operations by the operator, and a control part for collectively controlling the radio part, the memory part, the display part and the operational part, wherein: an image of image data corresponding to a pertinent opposite side party of communication is displayed on the display part under control by the control part in correspondence to a call arrival in the radio part and/or the acceptance of operation by the operation part based on combination data stored in the memory part.

The portable communication terminal set further comprises a camera part for generating image data corresponding to a foreground subject.

Non-response call arrival history data concerning non-response call arrivals not responded in the radio part are stored as communication history data in the memory part under control by the control part, and the image of image data corresponding to the opposite side party of communication concerning the newest non-response call arrival among the image data stored in the memory part, is displayed on the display part based on the non-response call arrival history data and combination data stored in the memory part.

Non-response call arrival history data concerning non-response call arrivals not responded in the radio part are stored as communication history data in the memory part under control by the control part, and the image of image data corresponding to the opposite side party of communication concerning the first non-response call arrival subsequent to the instant of execution of the newest operation on the operational part among the image data stored in the memory part, is displayed on the display part based on the non-response call arrival history data and combination data stored in the memory part.

Non-response call arrival history data concerning non-response call arrivals not responded in the radio part and priority order data defining the priority order of opposite side parties of communication are stored in the memory part under control by the control part, and in the initial stage of non-response call arrival check operation on the operational part, the image of image data among those stored in the memory part and corresponding to the opposite side party of communication of the highest priority order among the opposite side parties of communication among those corresponding to the non-response call arrival history data is displayed based on the non-response call arrival history data, priority order data and combination data stored in the memory part.

Non-response call arrival history data concerning non-response call arrivals not responded in the radio part and priority order data defining the priority order of opposite side parties of communication are stored in the memory part under control by the control part, and in the initial stage of non-response call arrival check operation on the operational part, the image of image data among those stored in the memory part and corresponding to the opposite side party of communication of the highest priority order among the opposite side parties of communication among those corresponding to the non-response call arrival history data is displayed in the largest size and images of a plurality of image data down to a subsequent predetermined priority order in progressively smaller scales at a time based on the non-response call arrival history data, priority order data and combination data stored in the memory part.

The priority order data is generated responsive to the operation of the operation part.

Under control by the control part, message data concerning messages received in the radio part is stored in the memory part, and images of image data corresponding to opposite side parties of communication concerning the messages among the image data stored in the memory part are displayed on the display part responsive to the operation of the operational part based on the stored message data and combination data stored in the memory part.

Under control by the control part a predetermined part of an image of image data corresponding to a pertinent opposite side party of communication among the image data stored in the memory part is trimmed and extracted responsive to the operation of the operational part, and the image extracted by the trimming is used as an image to be displayed on the display part in an enlarged scale to fit the display area of the display part.

Images of image data corresponding to pertinent opposite side parties of communication, as obtained by the pick-up in the camera part, are stored in the memory part under control of the control part and utilized as images to be displayed on the display part.

Images of image data corresponding to opposite side parties of communication, as obtained by communication of the radio part, are stored in the memory part under control of the control part and utilized as images to be displayed on the display part.

Under control by the control part the image or a predetermined part thereof of image data corresponding to a pertinent opposite side party of communication among the image data stored in the memory part is contracted responsive to the operation of the operational part, and the contracted image is displayed on the display part in a predetermined part thereof.

Under control by the control part letter row is displayed together with the image display on the display part based on letter data received in the radio part or preliminarily stored in the memory part.

The letter data preliminarily stored in the memory part may include letter row data representing opposite side parties of communication.

The letter data preliminarily stored in the memory part includes letter row data preset with the operator's will on the basis of operation of the operational part.

According to another aspect of the present invention, there is provided a portable communication terminal set with stored data including image data representing a plurality of images, opposite side party data representing a plurality of opposite side parties of communication, combination data representing the correspondence relation between the image data and opposite side party data and communication history data representing the history of communication, wherein an image of image data corresponding to a pertinent opposite side party of communication is displayed in response to a call arrival and/or a user's operation based on combination data stored in the memory part.

Other objects and features will be clarified from the following description with reference to attached drawings.

BRIEF DESCRIPTION OF THE DRAWINGS

FIG. 2 is a view showing an example of data structure of the combination data stored in the memory part according to the embodiment; and FIGS. 3 to 8 are views showing examples of display on the display part in the potable telephone set according to the embodiment.

PREFERRED EMBODIMENTS OF THE INVENTION

Preferred embodiments of the present invention will now be described with reference to the drawings.

Figure 1:
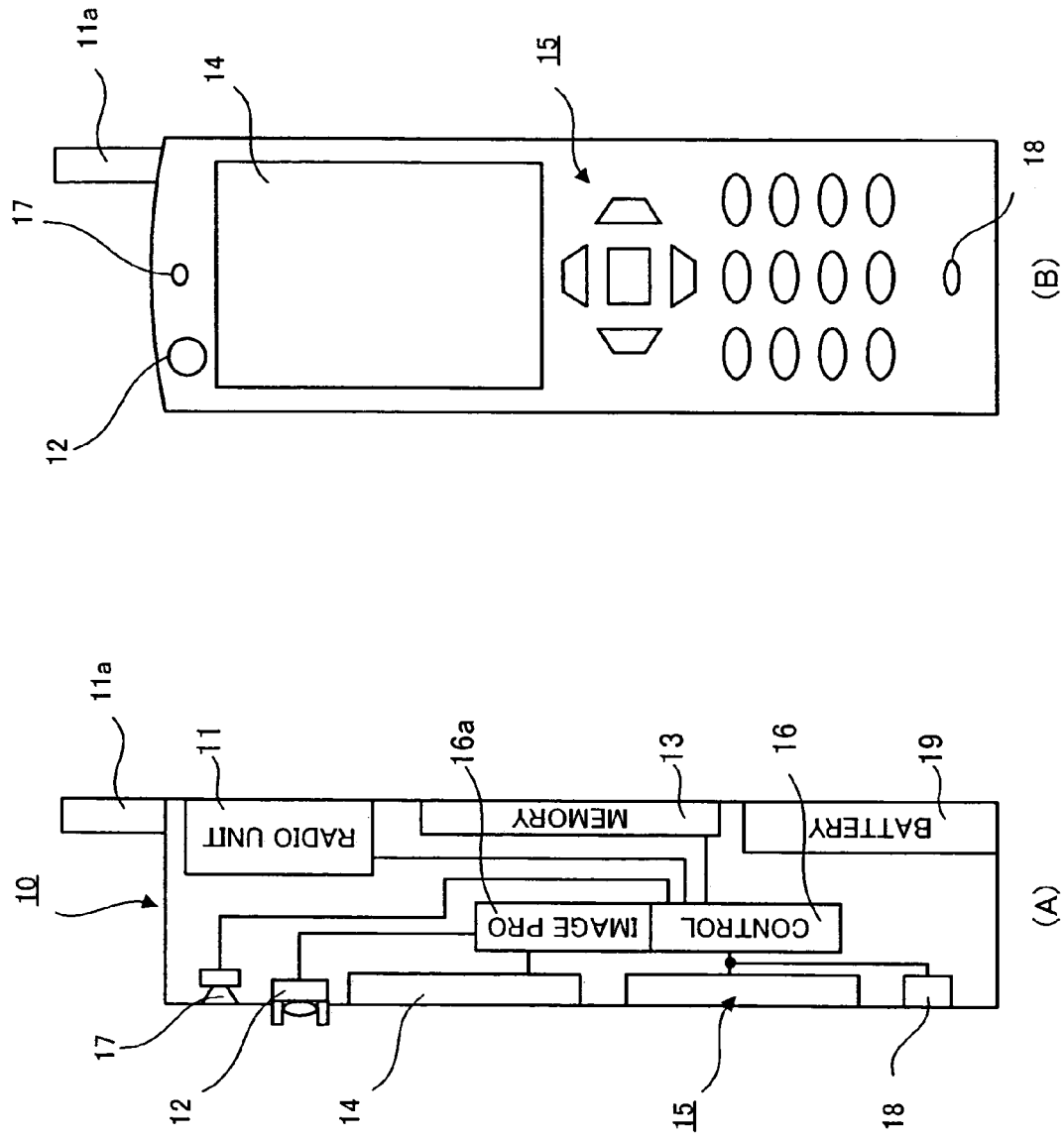
FIGS. 1(A) and 1(B) are views showing the construction of an embodiment of the portable communication terminal set according to the present invention, FIG. 1(A) being a block diagram showing the internal structure and FIG. 1(B) being a front view.

FIGS. 1(A) and 1(B) are views showing the construction of an embodiment of the portable communication terminal set according to the present invention. FIG. 1(A) is a block diagram showing the internal structure, and FIG. 1(B) is a front view.

This embodiment of the portable communication terminal set is a portable telephone set 10 comprises a radio part 11 for executing radio communication with base stations or like external apparatus. The radio part 11 includes an antenna 11a for executing communication with base stations. The portable telephone set 10 also comprises a memory part 13 for storing image data representing images of faces or the like of a plurality of opposite side parties of communication, as obtained by communication via the radio part 11 or generated by image pick-up using a camera part 12, opposite side party data representing the plurality of opposite side parties as telephone numbers or electronic mail addresses, combination data representing the correspondence relation between the above image data and opposite side party data and communication history data representing the history of communication by the radio part 11, as well as other necessary data and programs. The portable telephone set 10 further comprises a display part 14 for executing necessary displays, an operational part 15 for accepting operations by the operator and a control part 16 for collectively controlling a system including the radio part 11, the camera part 12, the memory part 13, the display part 14 and the operational part 15.

The portable telephone set 10 further comprises a loudspeaker 17 and a microphone 18 for inputting and outputting voice data and a battery 19 as power supply for operation. The control part 16 includes an image processing portion 16a for high-rate processing of the image data. Under control of the control part 16, an image of image data corresponding to a pertinent opposite side party of communication is displayed on the display part 14 on the basis of the above communication data stored in the memory part 13 in response to call arrival in the ratio part 11 or acceptance of operation in the operational part 15.

The control part 16 serves to collectively control the operation of the entire portable communication terminal set (i.e., portable telephone set) 10, and realizes a voice control function for carrying out voice communication and various other functions by executing the programs stored in the memory part 13. The control part 16 has a voice control function of digitalizing voice signal inputted from the microphone 18 and coding the digitalized voice signal in a predetermined voice coding system, thereby generating coded voice data for transmission via the radio part 11, decoding the coded voice signal and also converting the decoded signal to analog voice signal supplied to the loudspeaker 17, thereby outputting voice. The control part 16 further executes operations for realizing various functions important as portable telephone set, such as memory dial process function, re-dial process function and non-response call arrival process function.

The memory part 13 stores, in addition to programs and data for realizing the above various functions, re-dial telephone number data containing data of telephone numbers or the like, to which calls have been made, and non-response call arrival history data containing such data as telephone numbers of opposite side parties and times for call arrival thereto for notifying to the user call arrivals at times when the user of the present portable communication terminal was absent and could not respond to the calls.

The operational part 15 has a keyboard or the like, which is operable by the user for inputting various data to the portable communication terminal set 10 and has dial keys used for inputting telephone numbers and letters, a determination key for instructing determinations of various settings, a re-dial key for instructing execution of the re-dial, menu keys for displaying various selection keys and an arrow key (vertical or horizontal direction) for instructing section of menu items and switching of the display. These keys may be exclusively provided keys or those, to each of which a plurality of functions are allotted. This is well known in the art, and is not described here in details.

The portable telephone set 10 is adapted such that the above non-response call arrival history data are also stored as communication history data in the memory part 13 and that images of image data among those stored in the memory part 13 and corresponding to opposite side parties of communication concerning newest non-response call arrivals (for instance image data presenting faces of the opposite side parties) are displayed on the display part 14.

The image processing part 16a, under control of the control part 16, controls the display on the display part 14 and executes the coding and decoding of the data. The image processing part 16a serves to digitalize image signal generated by image pick-up in the camera part 12, encodes the resultant digital data in a predetermined coding system to generate the coded image signal data and feeds the obtained data to the control part 16. The image processing part 16a also serves to decode the coded image data fed from the control part 16, then convert the decoded data to analog image signal and feeds this signal to the display part 14 for display thereon.

The display part 14 is constituted by a liquid crystal display or the like, and displays various data thereon under control of the above image processing part 16a.

FIG. 2 is a view showing an example of data structure of the above combination data stored in the memory part 13. In the FIG. 2 example, as for the combination data a telephone number, an electronic mail address, a name (letter data) and image data of the face of an opposite side party of communication are registered in correspondence to one another as an entry.

In the combination data, the telephone number and the letter data representing a name are registered by operating the diary keys in the keyboard in the operational part 15. This embodiment of the portable communication terminal set (i.e., portable telephone set) 10 is adapted such that image data representing an image of a desired foreground subject, for instance the face of a person as the opposite side party, obtained by the pick-up in the camera part 12, can be registered in correspondence to the telephone number and the letter data representing the name.

In the portable telephone set 10 as this embodiment, the non-response call arrival history data concerning the non-response data arrivals not responded in the radio part 11 are stored as communication history data, and it is permitted to display, based on the non-response call arrival history data and the above combination data, the image data corresponding to an opposite side party of communication concerning the first non-response call arrival subsequent to the instant of the newest operation of the operational part 15 (i.e., the face of the opposite side party), among the image data stored in the memory part 13, on the display part 14. FIG. 3 is a view showing an example of display on the display part in the potable telephone set of this arrangement. In the embodiment, on the display part 14 is displayed the image of the face or the like of the opposite side party of communication, as the party of the first non-response call arrival therefrom after establishment of a status free from any intentional operation since some intentional operation of the portable telephone set 10 by the user. Thus, it is possible to reduce the possibility of missing an occasion of responding to a call in due time due to lapse of long time without noticing the call arrival.

In the embodiment of the portable communication terminal set (i.e., portable telephone set) 10 according to the present invention, the priority order data as data prescribing the priority order of opposite side parties of communication is also stored in the memory part 13. In the initial stage after the operation of the operational part 15, an image of image data corresponding to the opposite side party of communication of the highest priority order with priority to the priority order data among the opposite side parties of the non-response call arrival history data stored as image data in the memory part 13, is displayed in the display part based on the above non-response call arrival history data, the priority order data and the above combination data. FIG. 4 is a view showing an example such display on the display part in the portable telephone set of the arrangement. On the right upper part of the display, the above priority order (i.e., "1" in this example) is displayed. With this arrangement, it is possible to permit the user to recognize the contents of communication from a preferentially pertinent opposite side party of communication in correspondence to the preferential order recognized to be most important to the user and respond to the call without missing the occasion.

Figure 5:
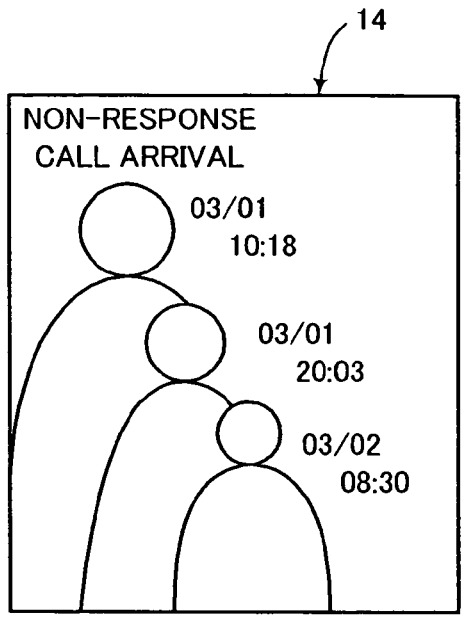

The display of the images of faces or the like of opposite side parties of communication based on the above priority order, may be permitted to be made one image after another in the higher priority order. Alternatively, the images (i.e., faces) may be made to be displayed in a single display in the larger scales the higher the priority order is. FIG. 5 is a view showing an example of display on the display part in the portable telephone set of the above arrangement. This case has an advantage that when non-response call arrivals are made from a plurality of opposite side parties of communication, by confirming the plurality of opposite side parties at a time in the same display, coping with these call arrivals may be made in the priority order.

As for the setting of the priority order, such an arrangement may be made that under control by the control part 16 priority order data is generated by operation on the operational part 15 and stored in the memory part 13 for utilization.

Figure 6:
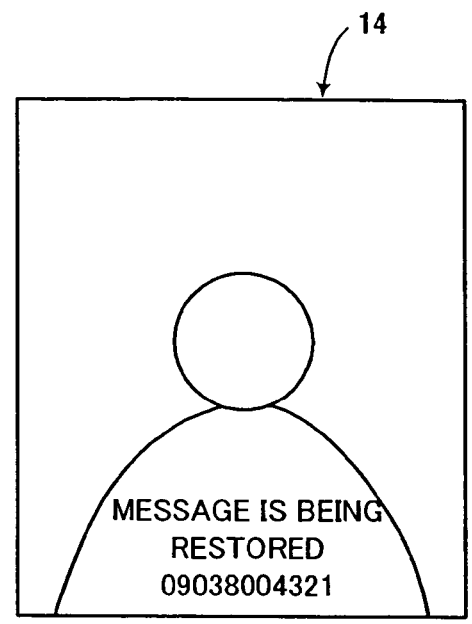

In the portable communication terminal set (i.e., portable telephone set) according to the present invention, stored are message data concerning the received message by the radio part 11 in the memory part 13 under control of the control part 16 and displayed are restored data of the messages among the image data stored in the memory part 13 and images of image data corresponding to the opposite side parties of communication on the display part 14 in response to operation on the operational part 15 based on the stored message data and the above combination data stored in the memory part 13. FIG. 6 is a view showing an example of display on the display part in the portable telephone set of this arrangement. In this case, it is possible to confirm stored message contents by excluding errors due to mistakes and clearly conforming the pertinent opposite side party of communication (i.e., caller) to a stored message.

Figure 7:
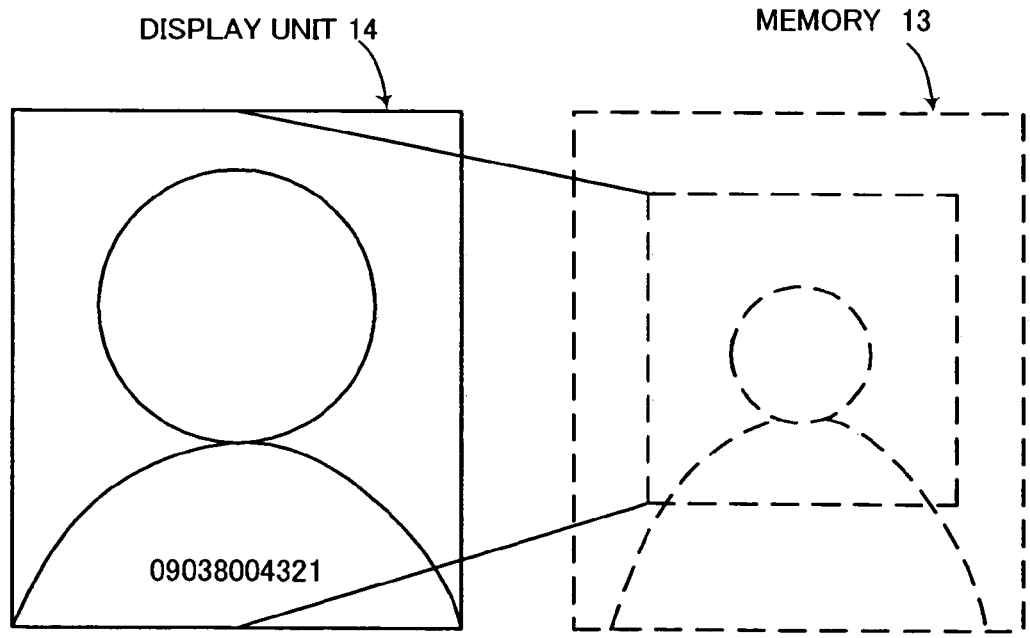

Furthermore, the portable communication terminal set (i.e., portable telephone set) according to the present invention may be arranged such that a predetermined part of image of image data corresponding to a pertinent opposite side party of communication (for instance a central part or a face part) among the image data stored in the memory part 13 can be trimmed and extracted on the basis of operation on the operational part 15 and under control by the control part 16, and also that the image extracted by the timing can be utilized as image to be displayed on the display part 14 and in an enlarged scale to fit the display screen of the display part 14. FIG. 7 is a view showing an example of display on the display part in the portable telephone set of this arrangement. In this case, a featuring part such as the face of the opposite side party of communication is particularly enlarged, so that the user can clearly confirm the opposite side party without agency of any glasses even when the visual power of the user has been slightly reduced.

Contrary to the above, it is conceivable to use image of image data corresponding to a pertinent opposite side party among the image data stored in the memory part 13 in a contracted scale. In this case, it is possible to sufficiently ensure the other part of display of the opposite side party such as letter data, which is sufficient depending on the status of communication.

In the meantime, an alternative to the arrangement that the image of image data corresponding to a pertinent opposite side party of communication as obtained by the pick-up in the camera part 12, is stored in the memory part 13 under control by the control part 16 and utilized as image to be displayed on the display part 14, is conceivable. That is, in lieu of the image of or along with image data obtained by the pick-up in the camera part 12, image of image data corresponding to the pertinent opposite side party of communication as obtained by communication via the radio part 11 may be adapted to be used as image to be displayed on the display part 14. In this case, it is possible to obtain display well suited to the user's taste and thus realize a set featuring improved convenience of use.

Figure 8:
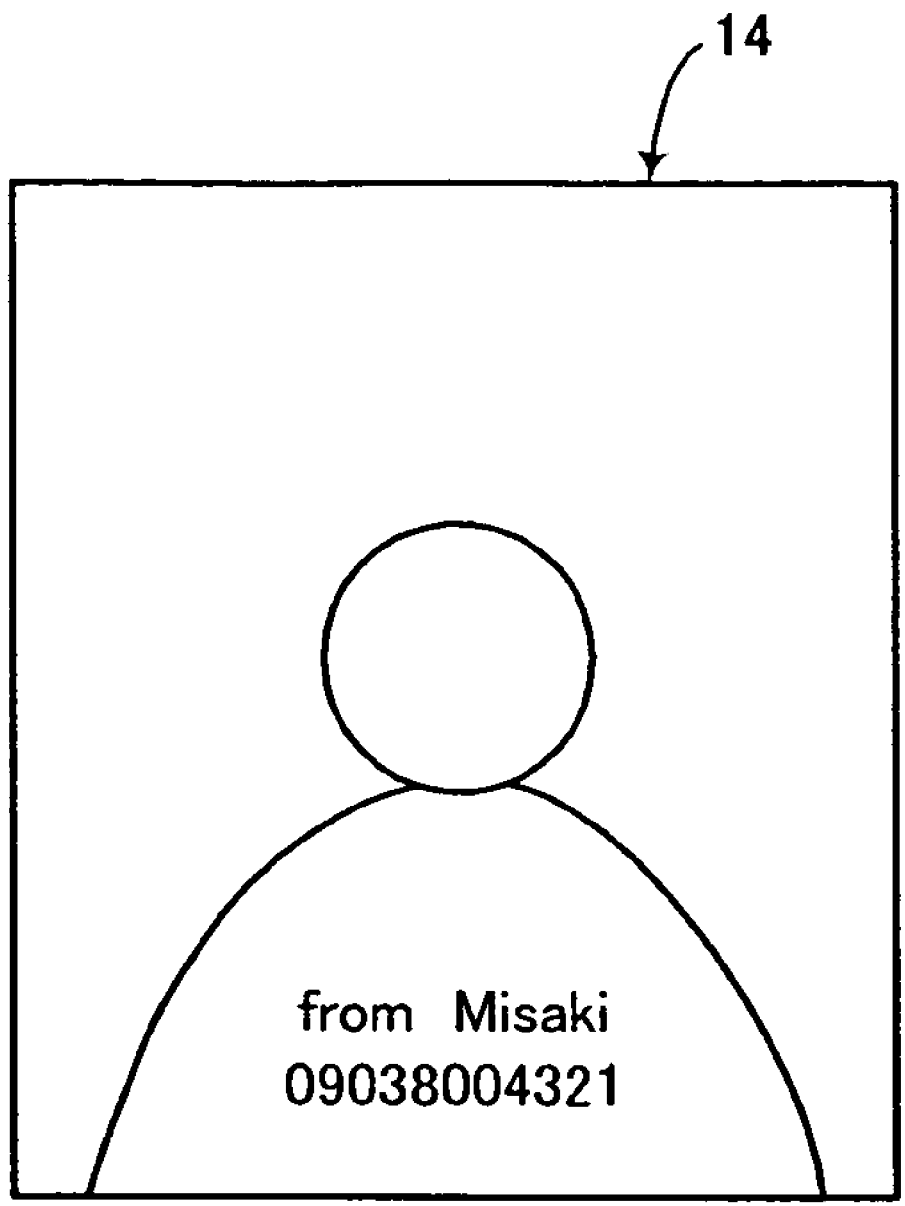

As a further embodiment of the present invention, it is possible to arrange such that a letter row may be displayed together with image on the display part 14 under control of the control part 16 based on the letter data, which is received in the control part 11 or has been preliminarily stored in the memory part 13. FIG. 8 is a view showing an example of display in the display part in the portable telephone set of this arrangement. Such letter rows may be formed by operation on the operational part such that they contain letter row data set in accordance with the operator's will. With this arrangement, it is possible to provide a set, which permits accurately transferring data with simple operation by preparing letter row data as several short messages of high frequency of use and is thus very convenient in use.

As has been described in the foregoing, according to the present invention it is possible to realize a portable communication terminal set of the pertaining kind, which permits effectively utilizing an image of a face or the like of an opposite side party of communication even in the case of utilizing non-response call arrival history or stored message and thus features further improved convenience of use.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A portable communication terminal set comprising a radio part for executing radio communication with external sets, a memory part for storing data including image data representing a plurality of images, opposite side party data representing a plurality of opposite side parties of communication, combination data representing the correspondence relation between the image data and opposite side party data and communication history data representing the history of communication executed by the radio part, a display part for executing necessary displays, an operation part for accepting operations by the operator, and a control part for collectively controlling the radio part, the memory part, the display part and the operational part, wherein:

an image of image data corresponding to a pertinent opposite side party of communication is displayed on the display part under control by the control part in correspondence to at least one of a call arrival in the radio part and the acceptance of operation by the operation part based on combination data stored in the memory part, and wherein non-response call arrival history data concerning non-response call arrivals not responded in the radio part and priority order data defining the priority order of opposite side parties of communication are stored in the memory part under control by the control part, and in the initial stage of non-response call arrival check operation on the operational part, the image of image data among those stored in the memory part and corresponding to the opposite side party of communication of the highest priority order among the opposite side parties of communication among those corresponding to the non-response call arrival history data is displayed, the image having various display sizes based on priority, based on the non-response call arrival history data, priority order data and combination data stored in the memory part.

2. The portable communication terminal set according to claim 1, which further comprises a camera part for generating image data corresponding to a foreground subject.

3. The portable communication terminal set according to claim 1, wherein non-response call arrival history data concerning non-response call arrivals not responded in the radio part are stored as communication history data in the memory part under control by the control part, and the image of image data corresponding to the opposite side party of communication concerning the newest non-response call arrival among the image data stored in the memory part, is displayed on the display part based on the non-response call arrival history data and combination data stored in the memory part.

4. The portable communication terminal set according to claim 1, wherein non-response call arrival history data concerning non-response call arrivals not responded in the radio part are stored as communication history data in the memory part under control by the control part, and the image of image data corresponding to the opposite side party of communication concerning the first non-response call arrival subsequent to the instant of execution of the newest operation on the operational part among the image data stored in the memory part, is displayed on the display part based on the non-response call arrival history data and combination data stored in the memory part.

5. The portable communication terminal set according to claim 1, wherein the priority order data is generated responsive to the operation of the operation part.

6. The portable communication terminal set according to claim 1, wherein under control by the control part, message data concerning messages received in the radio part is stored in the memory part, and images of image data corresponding to opposite side parties of communication concerning the messages among the image data stored in the memory part are displayed on the display part responsive to the operation of the operational part based on the stored message data and combination data stored in the memory part.

7. The portable communication terminal set according to claim 1, wherein under control by the control part a predetermined part of an image of image data corresponding to a pertinent opposite side party of communication among the image data stored in the memory part is trimmed and extracted responsive to the operation of the operational part, and the image extracted by the trimming is used as an image to be displayed on the display part in an enlarged scale to fit the display area of the display part.

8. The portable communication terminal set according to claim 2, wherein images of image data corresponding to pertinent opposite side parties of communication, as obtained by the pick-up in the camera part, are stored in the memory part under control of the control pan and utilized as images to be displayed on the display part.

9. The portable communication terminal set according to claim 1, wherein images of image data corresponding to opposite side parties of communication, as obtained by communication of the radio part, are stored in the memory part under control of the control part and utilized as images to be displayed on the display part.

10. The portable communication terminal set according to claim 1, wherein under control by the control part the image or a predetermined part thereof of image data corresponding to a pertinent opposite side party of communication among the image data stored in the memory part is contracted responsive to the operation of the operational part, and the contracted image is displayed on the display part in a predetermined part thereof.

11. The portable communication terminal set according to claim 1, wherein under control by the control part letter row is displayed together with the image display on the display part based on letter data received in the radio part or preliminarily stored in the memory part.

12. The portable communication terminal set according to claim 11, wherein the letter data preliminarily stored in the memory part may include letter row data representing opposite side parties of communication.

13. The portable communication terminal set according to claim 11, wherein the letter data preliminarily stored in the memory part includes letter row data preset with the operator's will on the basis of operation of the operational part.

14. The portable communication terminal set according to claim 2, wherein non-response call arrival history data concerning non-response call arrivals not responded in the radio part are stored as communication history data in the memory part under control by the control part, and the image of image data corresponding to the opposite side party of communication concerning the newest non-response call arrival among the image data stored in the memory part, is displayed on the display part based on the non-response call arrival history data and combination data stored in the memory part.

15. The portable communication terminal set according to claim 2, wherein non-response call arrival history data concerning non-response call arrivals not responded in the radio part are stored as communication history data in the memory part under control by the control part, and the image of image data corresponding to the opposite side party of communication concerning the first non-response call arrival subsequent to the instant of execution of the newest operation on the operational part among the image data stored in the memory part, is displayed on the display part based on the non-response call arrival history data and combination data stored in the memory part.

16. A portable communication terminal set comprising a radio part for executing radio communication with external sets, a memory part for storing data including image data representing a plurality of images, opposite side party data representing a plurality of opposite side parties of communication, combination data representing the correspondence relation between the image data and opposite side party data and communication history data representing the history of communication executed by the radio part, a display part for executing necessary displays, an operation part for accepting operations by the operator, and a control part for collectively controlling the radio part, the memory part, the display part and the operational part, wherein:
    an image of image data corresponding to a pertinent opposite side party of communication is displayed on the display part under control by the control part in correspondence to at least one of a call arrival in the radio part and the acceptance of operation by the operation part based on combination data stored in the memory part,
    said portable communication terminal set further comprising a camera part for generating image data corresponding to a foreground subject,
    wherein non-response call arrival history data concerning non-response call arrivals not responded in the radio part and priority order data defining the priority order of opposite side parties of communication are stored in the memory part under control by the control part, and in the initial stage of non-response call arrival check operation on the operational part, the image of image data among those stored in the memory part and corresponding to the opposite side party of communication of the highest priority order among the opposite side parties of communication among those corresponding to the non-response call arrival history data is displayed in the largest size and images of a plurality of image data down to a subsequent predetermined priority order in progressively smaller scales at a time based on the non-response call arrival history data, priority order data and combination data stored in the memory part.

17. The portable communication terminal set according to claim 16, wherein the priority order data is generated responsive to the operation of the operation part.

18. A portable communication terminal set comprising a radio part for executing radio communication with external sets, a memory part for storing data including image data representing a plurality of images, opposite side party data representing a plurality of opposite side parties of communication, combination data representing the correspondence relation between the image data and opposite side party data and communication history data representing the history of communication executed by the radio part, a display part for executing necessary displays, an operation part for accepting operations by the operator, and a control part for collectively controlling the radio part, the memory part, the display part and the operational part, wherein:
    an image of image data corresponding to a pertinent opposite side party of communication is displayed on the display part under control by the control part in correspondence to at least one of a call arrival in the radio part and the acceptance of operation by the operation part based on combination data stored in the memory part,
    said portable communication terminal set further comprising a camera part for generating image data corresponding to a foreground subject, wherein non-response call arrival history data concerning non-response call arrivals not responded in the radio part and priority order data defining the priority order of opposite side parties of communication are stored in the memory part under control by the control part, and in the initial stage of non-response call arrival check operation on the operational part, the image of image data among those stored in the memory part and corresponding to the opposite side party of communication of the highest priority order among the opposite side parties of communication among those corresponding to the non-response call arrival history data is displayed, the image having various sizes based on priority, based on the non-response call arrival history data, priority order data and combination data stored in the memory part.

* * * * *